United States Patent
Suga et al.

[11] Patent Number: 6,161,660
[45] Date of Patent: Dec. 19, 2000

[54] ROTOR FOR DISC BRAKE

[75] Inventors: Toshitaka Suga, Nagoya; Haruhisa Baba, Chiryu; Hideyuki Kai, Toyota, all of Japan

[73] Assignee: Aisin Seiki Kabushiki Kaisha, Kariya, Japan

[21] Appl. No.: 09/185,971

[22] Filed: Nov. 5, 1998

[30] Foreign Application Priority Data

Nov. 5, 1997 [JP] Japan ................................ 9-303039

[51] Int. Cl.[7] ................................................ F16D 65/847
[52] U.S. Cl. ................................ 188/218 XL; 188/250 E
[58] Field of Search ........................ 188/218 XL, 218 R, 188/73.37, 73.35, 73.36, 250 E

[56] References Cited

U.S. PATENT DOCUMENTS

| | | | |
|---|---|---|---|
| 4,379,501 | 4/1983 | Hagiwara et al. | 188/218 XL |
| 5,735,366 | 4/1998 | Suga et al. | 188/218 XL |

FOREIGN PATENT DOCUMENTS

| | | |
|---|---|---|
| 62-97329 | 6/1987 | Japan . |
| 3-189431 | 8/1991 | Japan . |
| 5-74731 | 10/1993 | Japan . |
| 6-185552 | 7/1994 | Japan . |

*Primary Examiner*—Matthew C. Graham
*Assistant Examiner*—Pamela J. Lipka
*Attorney, Agent, or Firm*—Burns, Doane, Swecker & Mathis, LLP

[57] ABSTRACT

A disc rotor for a disc brake which is designed to make it difficult to cause brake squeal includes inner and outer discs, and first and second radially extending long holes formed in the outer and inner discs. The angular intervals between the long holes are made to differ between the outer disc and the inner disc, and two vibration modes are produced to interfere with each other during braking operation by which the occurrence of a steady-state vibration mode is restrained. In addition fins are provided between the two discs, with the fins including several fins arranged to reinforce both the inner and outer discs.

10 Claims, 7 Drawing Sheets

ROTOR FOR DISC BRAKE

This application is based on and claims priority under 35 U.S.C. § 119 with respect to Japanese Application No. 09(1997)-303039 filed on Nov. 5, 1997, the entire content of which is incorporated herein by reference.

FIELD OF THE INVENTION

The present invention generally relates to disc brakes. More particularly, the present invention pertains to a rotor for a disc brake used as a vehicle wheel brake.

BACKGROUND OF THE INVENTION

It is known that in a rotor for a disc brake of a vehicle that causes brake squeal, the sliding portion of a rotor, that is the disc portion, is in a steady-state vibration mode in which loops and nodes of vibration in the rotor shaft direction emerge in an alternating fashion in the peripheral direction of the rotor. Although the number of nodes varies depending on the dimensions and shape of the rotor, the number is usually between two and ten in the case of a rotor having typical dimensions and shape.

Japanese Unexamined Utility Model Publication No. JU-A-62-97329 proposes that in order to restrain the occurrence of brake squeal by exciting or producing a vibration mode having a number of modes which make it difficult to cause brake squeal, a number of radial grooves extending to the outer periphery from the inner periphery of one side face of a rotor are formed at equal angular intervals. Further, a number of radial grooves are also formed on other side face of the rotor symmetrically with the radial grooves on the one side face of the rotor.

However, with this proposal, the number of nodes of the vibration mode excited or produced by the grooves formed on the one side face of the rotor is equal to the number of nodes of the vibration mode excited or produced by the grooves formed on the other side face of the rotor, whereby the vibration occurring in the vibration mode produced by the grooves formed on the one side face is promoted by the grooves formed on the other side face. Accordingly, a steady-state vibration mode is produced and brake squeal is highly likely to occur.

Thus, a need exists for a rotor for a disc brake which is able to avoid producing a steady-state vibration mode amounting to the occurrence of brake squeal.

SUMMARY OF THE INVENTION

According to an aspect of the present invention, a rotor for a disc brake includes an outer disc, an inner disc arranged coaxially with the outer disc, a plurality of first long holes extending from the inner periphery of the outer disc to the outer periphery of the outer disc and formed in the outer disc at first equal angular intervals, and a plurality of second long holes extending from the inner periphery of the inner disc to the outer periphery of the inner disc and formed in the inner disc at second equal angular intervals different from the first equal angular intervals.

The first and second elongated holes are preferably arranged in the radial directions of the outer disc and the inner disc. The number of first holes and the number of second holes are selected such that the number of nodes of a vibration mode produced by the first holes in the outer disc does not coincide with the number of nodes of a vibration mode produced by the second holes in the inner disc, except possibly where the number of nodes is two.

The disc rotor for a disc brake can also include first reinforcement fins arranged between the outer disc and the inner disc along the first holes, and second reinforcement fins arranged between the outer disc and the inner disc along the second holes. The reinforcement fins preferably extend along the opposite edges of the holes. Vibration modes are produced respectively in the outer disc and the inner disc during a braking operation and by mutual interference between the vibration modes, the occurrence of a steady-state vibrational mode is restrained and so the occurrence of brake squeal is restrained.

According to another aspect of the invention, a disc brake rotor includes first and second discs each provided with a plurality of elongated holes. The holes in the first disc extend from the inner circumferential boundary to the outer circumferential boundary of the first disc, with the holes being substantially equally spaced by a first angular interval and the first angular interval producing a first number of nodes. The holes in the second disc extend from the inner circumferential boundary to the outer circumferential boundary of the second disc, with the second holes being substantially equally spaced at a second angular interval that produces a second number of nodes. The second number of nodes produced by the second angular interval being different from the first number of nodes produced by the first angular interval except that the first and second number of nodes may commonly produce two nodes.

BRIEF DESCRIPTION OF THE DRAWING FIGURES

Additional features and characteristics of the present invention will become more apparent from the following detailed description considered with reference to the accompanying drawing figures in which like elements are designated by like reference numeral and wherein.

DETAILED DESCRIPTION OF THE PREFERRED EMBODIMENTS

Figure 1:
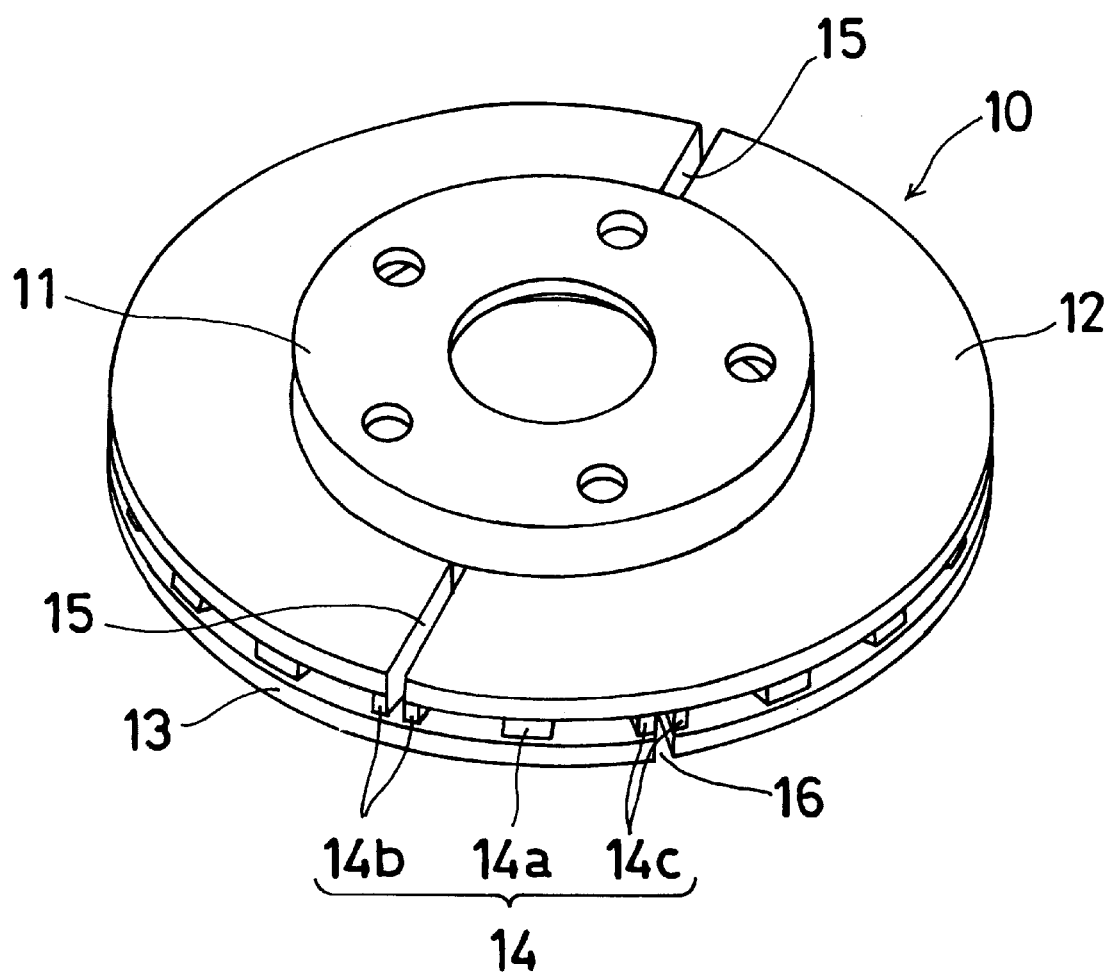
FIG. 1 is a perspective view of a disc rotor according to an embodiment of the present invention.
Figure 2:
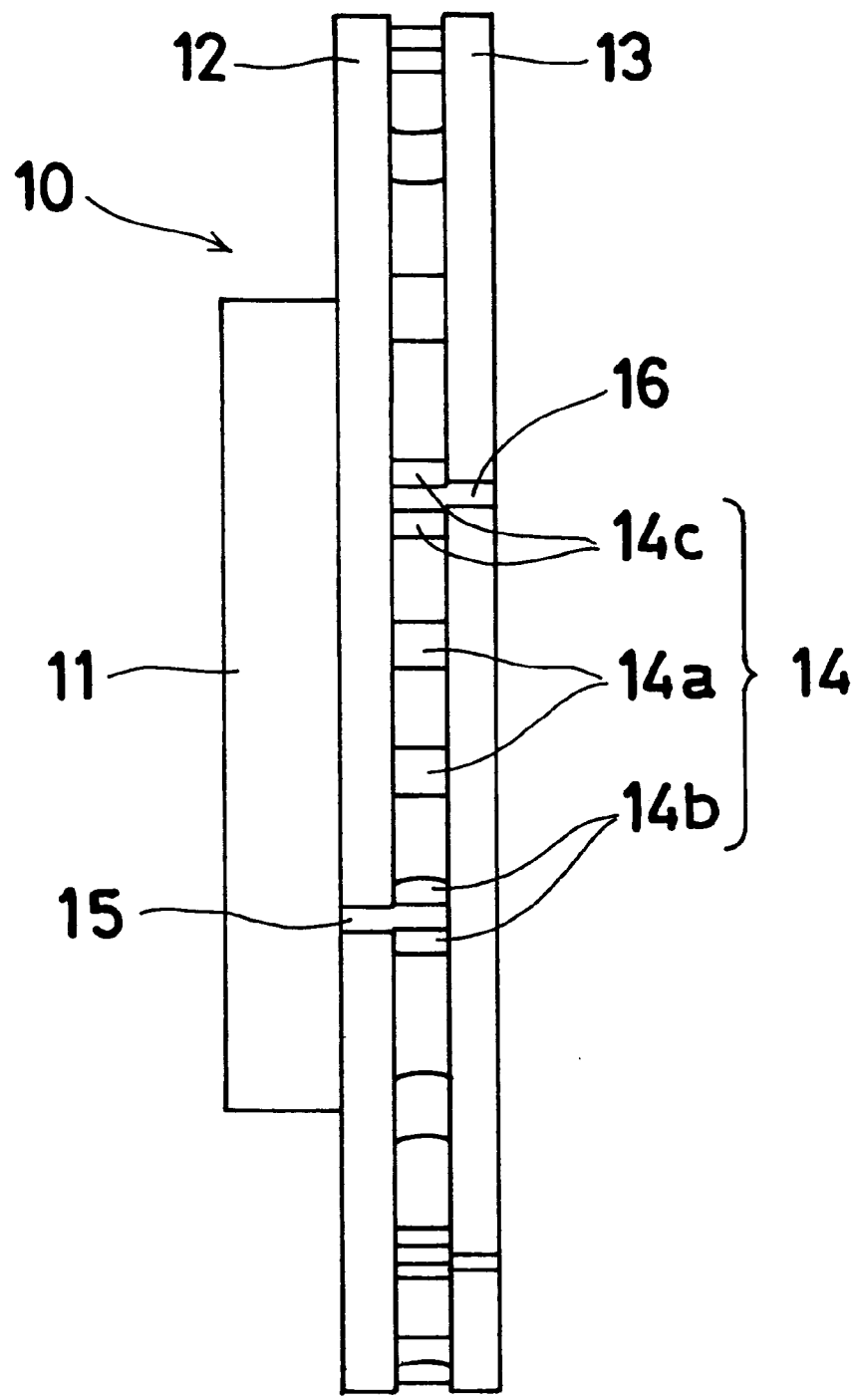
FIG. 2 is a side view of the disc rotor shown in FIG. 1.
Figure 3:
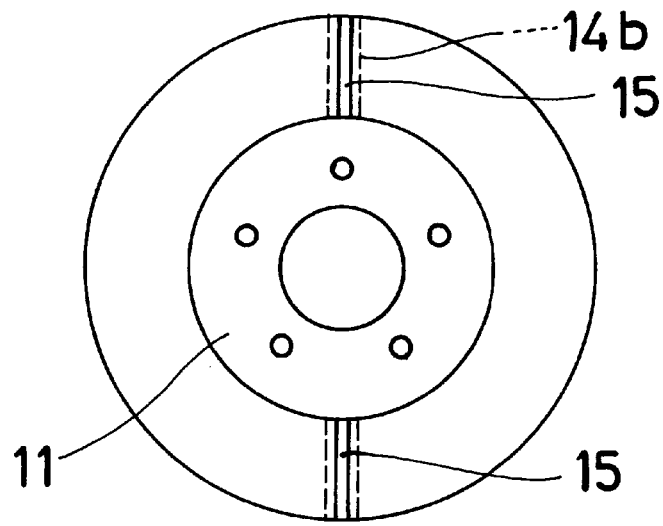
FIG. 3 is a side view of the rotor shown in FIG. 2 as seen from the left in FIG. 2.
Figure 4:
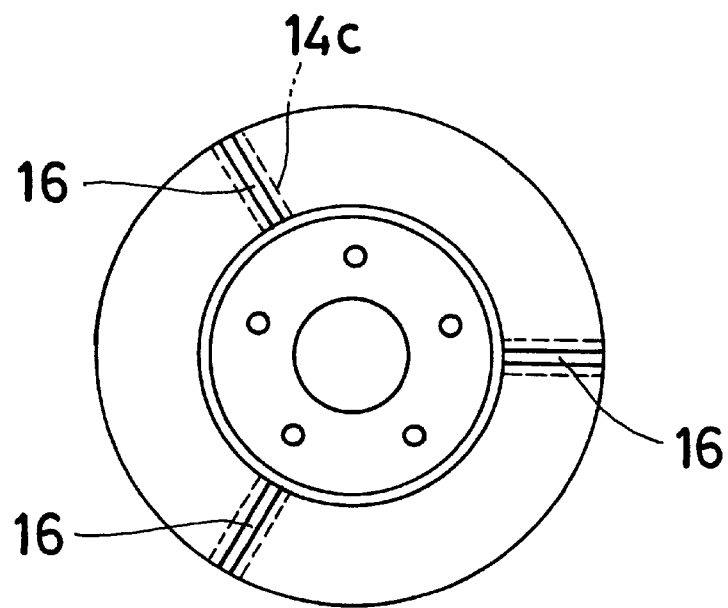
FIG. 4 is a side view of the rotor shown in FIG. 2 as seen from the right in FIG. 2.
Figure 5:
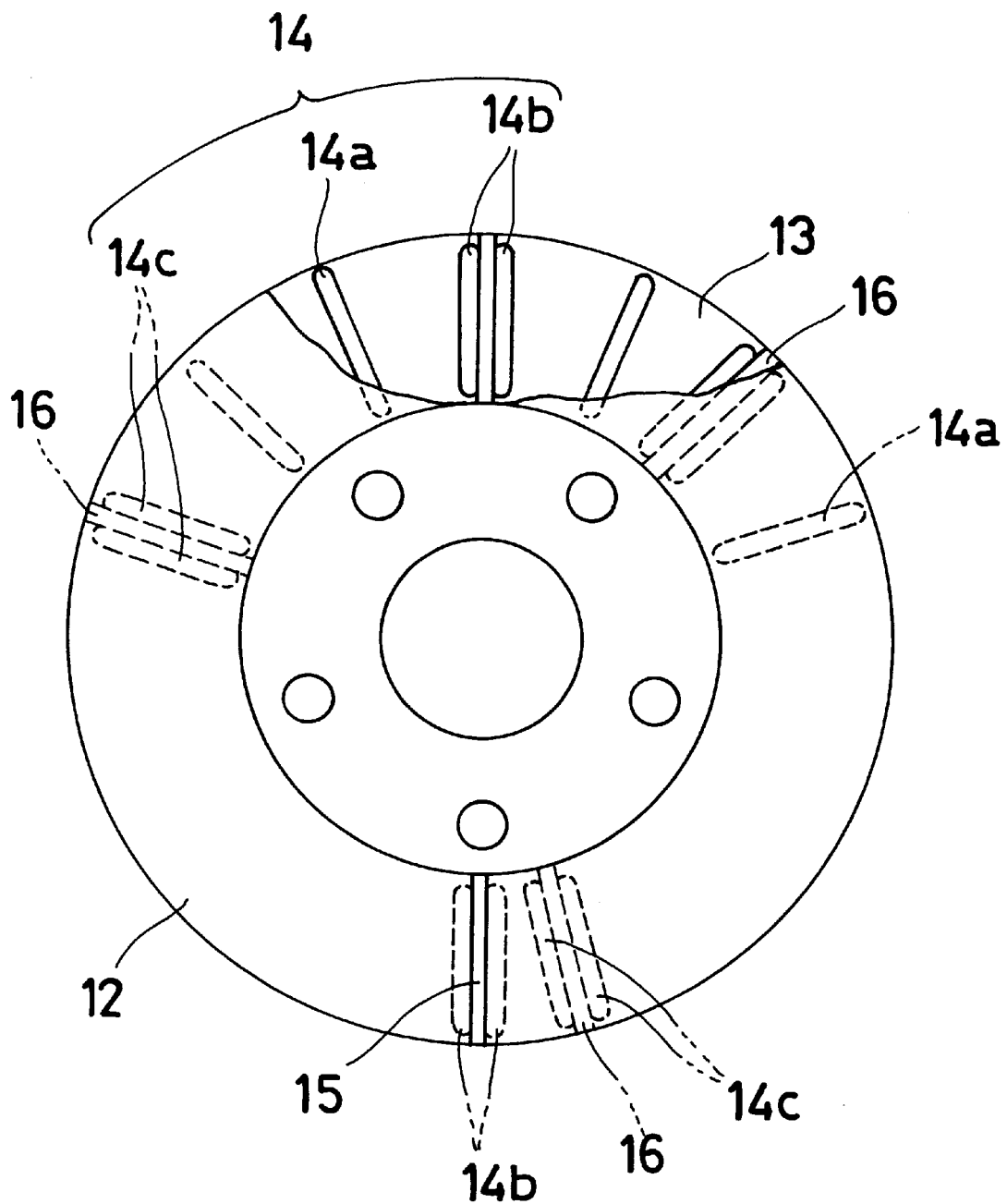
FIG. 5 is a side view similar to FIG. 3 shown partially in section.

Referring to FIGS. 1–5, the disc rotor 10 according to the present invention, which is generally referred to as a ventilated rotor, is provided with an attaching portion 11 for attaching to a wheel hub, an outer disc 12, and an inner disc 13 for rubbing or being engaged by a brake pad. The inner and outer discs 12, 13 are arranged coaxially. A plurality of radially extending cooling fins 14 are interposed between the outer disc 12 and the inner disc 13. The cooling fins 14 are connected to the outer disc 12 and the inner disc 13.

The outer disc 12 disposed on the outer side of the rotor (i.e., the left side as viewed with reference to FIG. 2) when mounted to a vehicle is formed with two elongated first slots or holes 15. These holes 15 extend in the radial direction on the outer disc 12 from the inner periphery of the outer disc 12 to the outer periphery of the outer disc 12. The holes 15 penetrate from the outer side face of the outer disc 12 to the inner side face of the outer disc 12 so that the holes 15 extend entirely through the outer disc 12. The two slots or holes 15 are disposed diametrically opposite one another so as to be spaced apart from one another by equal first angles of 180°.

The inner disc 13 disposed on the inner side of the rotor (i.e., the right side as viewed with reference to FIG. 2) when mounted to a vehicle is formed with three elongated second slots or holes 16. These holes 16 extend in the radial direction on the inner disc 13 from the inner periphery of the inner disc 13 to the outer periphery of the inner disc 13. The holes 16 penetrate from the outer side face of the inner disc 13 to the inner side face of the inner disc 13. The three slots or holes 16 are spaced apart from one another at equal second angles. That is, the three slots or holes 16 are spaced apart at 120° intervals around the inner disc 13.

As noted above, the fins 14 are radially arranged and extend from the inner peripheries to the outer peripheries of both discs 12, 13. As best seen in FIG. 1, the fins 14 include first fins 14a arranged between the outer disc 12 and the inner disc 13, second fins 14b constituting first reinforcement fin arranged between the outer disc 12 and the inner disc 13 along the sides of the long first holes 15, and third fins 14c constituting second reinforcement fins arranged between the outer disc 12 and the inner disc 13 along the sides of the long second holes 16.

The positions of the elongated first holes 15 of the outer disc 12 and the elongated second holes 16 of the inner disc 13 are determined so that the second fins 14b are circumferentially spaced from and not disposed at the same place as the elongated second holes 16 on the inner disc 13, and so that the third fins 14c are circumferentially spaced from and not disposed at the same place as the elongated first holes 15 on the outer disc 12.

By virtue of the above-described construction, even when the portion of the outer disc 12 where the elongated first holes 15 are formed is pressed by the pad, deformation of the outer disc 12 by the pressing force of the pad is inhibited or prevented because of the arrangement or presence of the second fins 14b. Similarly, in connection with the inner disc 13, even when the portion of the inner disc 13 where the elongated second holes 16 are formed is pressed by the pad, deformation of the inner disc 13 by the pressing force of the pad can be prevented because of the presence or location of the third fins 14c.

Figure 6:
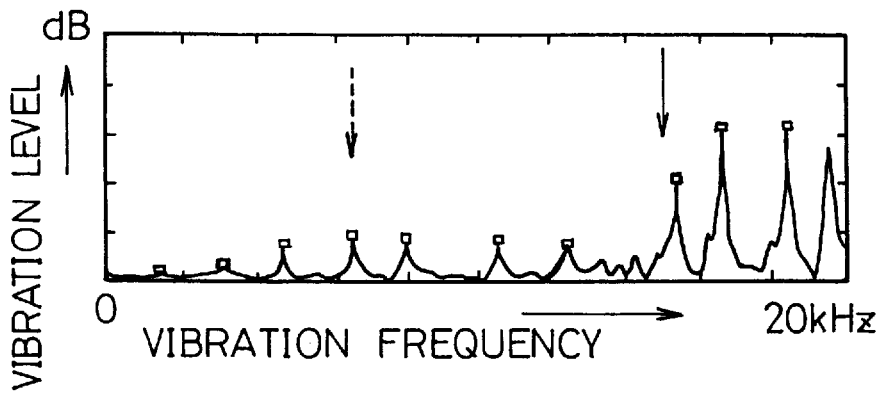
FIG. 6 is a diagram showing the vibration response performance of a conventional ventilated rotor.
Figure 7:
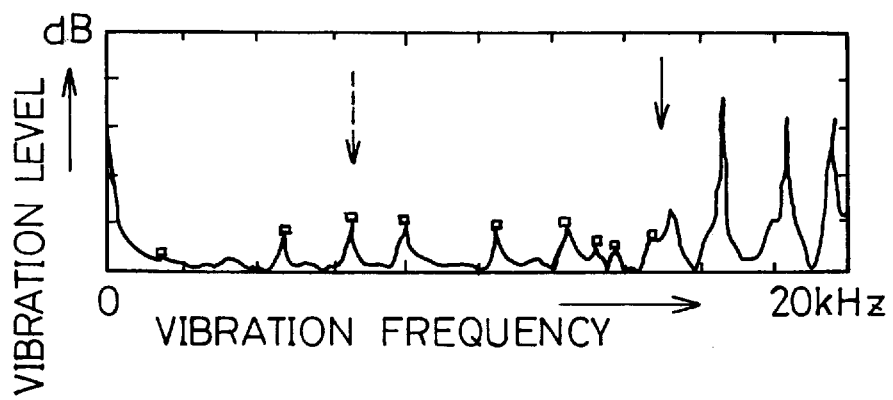
FIG. 7 is a diagram showing the vibration response performance of a rotor having long holes in the shape of radial grooves.
Figure 8:
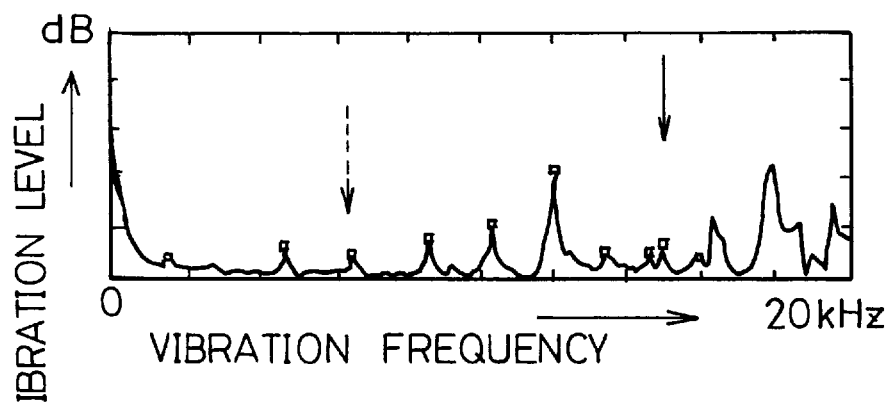
FIG. 8 is a diagram showing the vibration response performance of the ventilated rotor of the present invention shown in FIG. 1.

FIGS. 6–8 show the vibration response performance of different rotors for comparison purposes. In each diagram, the abscissa designates the vibration frequency (unit; kHz) and the ordinate designates the vibration level (unit; dB). FIG. 6 shows the vibration response performance of a ventilated rotor in which long holes arranged in a radial shape are not formed in the outer and inner discs. FIG. 7 shows the vibration response performance of a ventilated rotor in which three long holes arranged in the shape of radial grooves are symmetrically formed at the outer and inner discs. FIG. 8 shows the vibration response performance of the ventilated rotor 10 according to the present invention as shown in FIGS. 1–5. Brake squeal is caused at the vibration frequency indicated by the broken line arrows shown in FIG. 6 and FIG. 7. As shown in FIG. 8, in the ventilated rotor 10 of the present invention, the vibration level at the vibration frequency corresponding to the broken line arrow marks in FIG. 6 and FIG. 7 is lowered and the occurrence rate of brake squeal is lowered.

FIG. 6 shows brake squeal is caused at a vibration frequency designated by the bold line arrow mark. As seen in FIG. 8, in the ventilated rotor 10 of the present invention shown in FIGS. 1–5, the vibration level at the vibration frequency corresponding to that indicated by the bold line arrow mark in FIG. 6 is lowered and brake squeal is not caused.

The disc rotor of the present invention is designed so that the mode of vibration produced on one side of the rotor during braking operation differs from the mode of vibration produced on the other side of the rotor during braking operation. The two modes of vibrations thus interfere with each other to suppress the production of vibrations of a stationary wave mode. In this way, the rotor significantly reduces and substantially prevents or eliminates brake squeal.

The number of nodes of vibration of the modes caused by the elongated first and second holes or slots 15, 16 is based upon or determined by the angular interval between the elongated holes 15, 16. In other words, the number of nodes of vibrations of the modes caused by each of the elongated holes 15, 16 is the same as the common divisors associated with the number of elongated holes. By way of example, and as identified below, the use of six radial holes causes 2 nodes and 3 nodes to be produced (the numbers 2 and 3 representing the common divisors for the number 6 which is the number of elongated holes) while the use of twelve elongated holes causes 2, 3, 4 and 6 nodes to be produced (the numbers 2, 3, 4 and 6 representing the common divisors for the number 12 which is the number of elongated holes).

According to the present invention, the angular interval at which the radial elongated holes 15 are spaced from one another on the outer disc 12 and the angular interval at which the radial elongated holes 16 are spaced from one another on the inner disc 13 are determined as a combination of two angles selected from a group of the following angles $q_1$–$q_{12}$. The two angles are selected such that the two selected angles do not cause an equal number of nodes, except possibly for the situation where both selected angles cause two nodes of vibration.

In other words, in accordance with the present invention, when selecting an angular spacing for the elongated holes 15 in the outer disc 12 and the elongated holes 16 in the inner disc 13, the number of nodes of vibration associated with each particular spacing should be considered, and the angular spacing for each set of elongated holes should be selected so that the number of nodes produced by the selected angular spacing for the one set of elongated holes 15 in the outer disc 12 is not equal to the number of nodes produced by the selected angular spacing for the other set of elongated holes 16 in the inner disc 13, except that the angular spacing for the two sets of elongated holes 15, 16 can be selected such that they both cause 2 nodes to occur.

$q_1$=360°/16 . . . 2, 4, 8 nodes
$q_2$=360°/14 . . . 2, 7 nodes
$q_3$=360°/12 . . . 2, 3, 4, 6 nodes
$q_4$=360°/10 . . . 2, 5, 10 nodes $q_5 = 360°/9$ ... 3, 9 nodes
$q_6 = 360°/8$ ... 2, 4 nodes
$q_7 = 360°/7$ ... 7 nodes
$q_8 = 360°/6$ ... 2, 3 nodes
$q_9 = 360°/5$ ... 5 nodes
$q_{10} = 360°/14$ ... 2, 4 nodes
$q_{11} = 360°/3$ ... 3 nodes
$q_{12} = 360°/2$ ... 2 nodes Thus, the angular intervals $q_1$–$q_{12}$ identified above are variations of the angular intervals of each of the elongated first and second holes 15, 16. The associated nodes are caused by holes having one of the angular intervals $q_1$–$q_{12}$. For example, when four elongated holes are provided and are spaced apart at an interval of 90° as represented by the angular interval $q_{10}$ above, vibrations having two and four nodes occur. Similarly, when ten elongated holes are provided and are spaced apart at equal intervals of 36° as represented by the angular interval $q_4$ above, vibrations having two, five and ten nodes occur.

To significantly reduce or substantially eliminate stationary wave vibrations, the angular intervals of the elongated first and second holes 15, 16 are selected from the above-identified angles and are selected such that the two selected angles do not cause the same number of vibrational nodes. Because the frequency of a wave having two nodes is relatively low and squealing noise typically occurs at a relatively high frequency, the angular interval or spacing for the two sets of elongated holes 15, 16 may be selected such that both angular intervals cause two nodes of vibration. This will widen the potential selections for the angular intervals of the two sets of elongated first and second holes 15, 16.

Thus, in the case of the embodiment described above, the outer disc 12 is divided in two at equal angles of 180° by the two elongated first holes 15 and the inner disc 13 is divided in three at equal angles of 120° by the three elongated second holes 16. These two selected angular intervals do not cause the same number of vibrational nodes. Further, the outer disc 12 can be divided in two at equal angles of 180° by two elongated first holes 15 while the inner disc 13 is divided in five equal angles of 72° by five elongated second holes 16. Once again, these two selected angular intervals do not cause the same number of vibrational nodes. By way of further example, if the outer disc 12 is divided into segments having equal angles of 30° by the provision of twelve elongated holes 15 (i.e., the angular spacing $q_3$), the possible equal angular spacing for the inner disc 13 includes the angles identified as $q_2$, $q_4$, $q_7$, $q_9$, $q_{12}$ because the number of nodes of vibration associated with those latter angular spacings do not coincide with the number of nodes of vibration associated with the angular spacing $q_3$, except possibly where both selected angles cause two nodes of vibration to occur. The first equal angle and the second equal angle are set such that a ratio of the division number divided by the first equal angles and the division number divided by the second equal angles is, for example, 2:3, 2:5, 3:4, 3:5, ...

As has been explained, in the rotor 10 for a disc brake according to the present invention, two of the elongated first holes 15 are formed in the outer disc 12 at equal angles (180°) and three of the elongated second holes 16 are formed in the inner disc 13 at equal angles (120°). Thus, during a braking operation, a vibration mode having a number of nodes making it difficult to cause brake squeal is produced by the two elongated first holes 15 in the outer disc 12, a vibration mode having a number of nodes making it difficult to cause brake squeal is produced by the three elongated second holes 16 in the inner disc 13, and the occurrence of a steady-state vibration mode is restrained by mutual interference between the vibration modes caused by the outer and inner discs 12, 13.

In disc rotors having discs where grooves are formed, it is difficult to firmly produce a vibration mode having a number of nodes which make it difficult to cause brake squeal because continuity in the discs in the peripheral direction still exists by virtue of the connecting bottom portions of the grooves. In the disc rotor of the present invention, the outer and the inner discs 12, 13 are formed with the long or elongated holes 15, 16 by which the respective discs 12, 13 are divided firmly in the peripheral direction. Accordingly, a vibration mode having a number of nodes making it difficult to cause brake squeal can be reliably produced and so the occurrence of brake squeal can be restrained more firmly.

Additionally, the second and the third fins 14b, 14c are arranged in an advantageous manner so that there is no concern of deforming the discs 12, 13 even when portions of the discs 12 and 13 where the long or elongated holes 15, 16 are arranged are pressed by the brake pad.

Therefore, it is possible to produce a disc rotor 10 for a disc brake which makes it difficult to cause a steady-state vibration mode amounting to the occurrence of brake squeal.

Although the elongated holes 15, 16 are formed in a linear shape, the present invention is not particularly limited to this construction. For example, a similar operation and effect can be achieved even with a disc rotor for a disc brake according to the present invention possesses elongated holes having a bent shape.

Further, although the elongated holes 15, 16 are arranged in a radial arrangement, the present invention is not limited to this particular construction. For example, a similar operation and effect can be achieved with a disc rotor in which the first and second elongated holes are arranged to be inclined to the radial direction.

Figure 9:
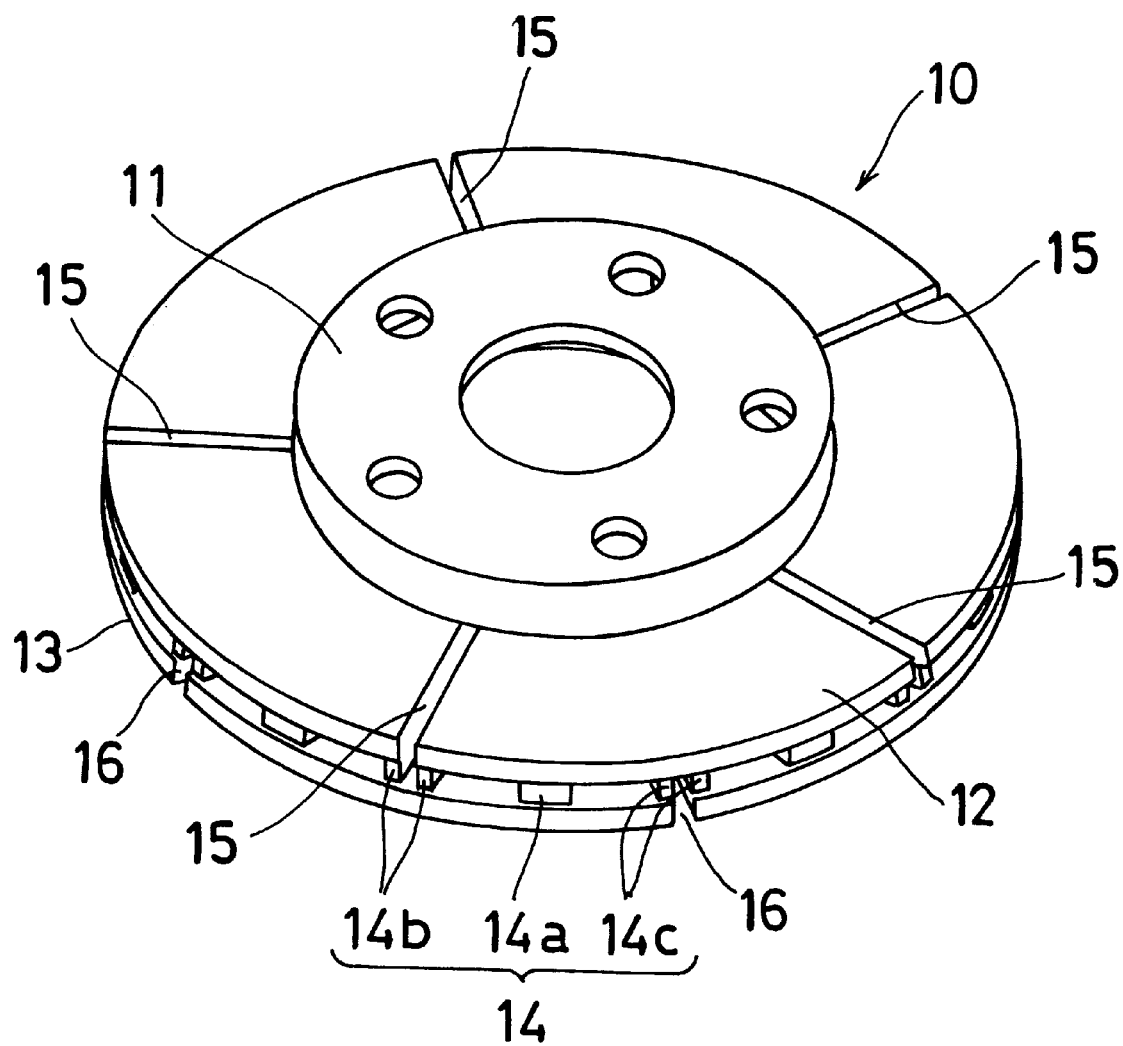
FIG. 9 is a perspective view of a disc rotor according to another embodiment of the present invention.
Figure 10:
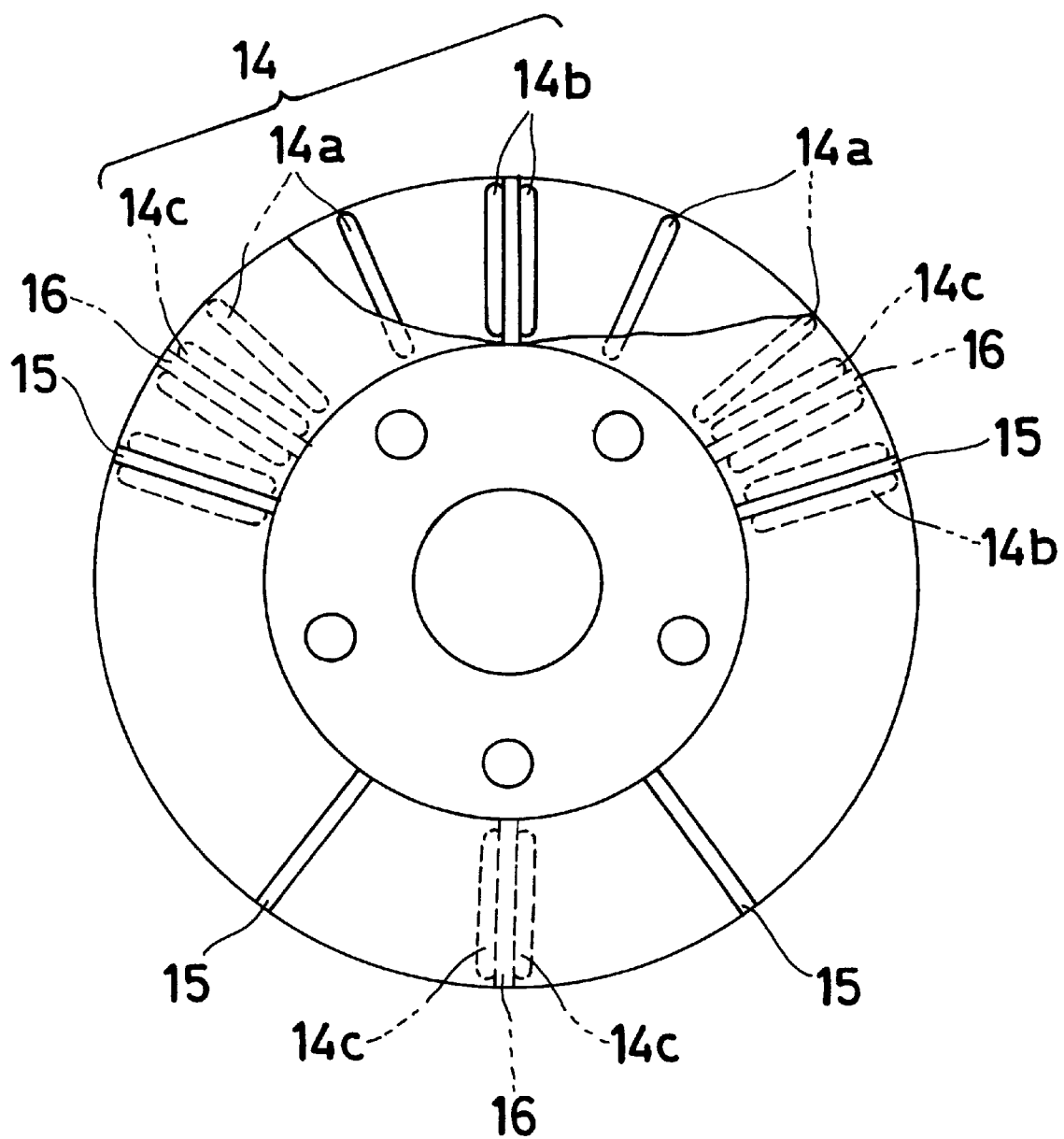
FIG. 10 is a top plan view of the disc rotor shown in FIG. 9.

A second embodiment of the disc rotor according to the present invention is shown in FIGS. 9 and 10. Many of the features associated with the disc rotor of this embodiment are the same as in the first embodiment and so a detailed description will not be repeated here. In this second embodiment, the angular intervals of the elongated first and second holes differ from those in the first embodiment.

As shown in FIGS. 9 and 10, the disc rotor 10, which is generally referred to as a ventilated rotor, is provided with the attaching portion 11 for attaching to a wheel hub, the outer disc 12 and the inner disc 13. In addition, the plurality of cooling fins 14 are interposed between the outer disc 12 and the inner disc 13 for connecting the outer disc 12 and the inner disc 13.

The outer disc 12 disposed on the outer side (i.e., the upper side as viewed with respect to FIG. 9) in a state in which the rotor is mounted to a vehicle is formed with five of the elongated first holes 15. These holes 15 extend in the radial direction to the outer periphery of the outer disc 12 from the inner periphery of the outer disc 15. The holes 15 are spaced apart at equal angles, that is at equal angular intervals of 72°.

The inner disc 13 disposed on the inner side (i.e., the lower side when viewed with reference to FIG. 9) in a state in which the rotor is mounted to a vehicle is formed with three of the elongated holes 16. The elongated holes 16 extend in the radial direction to the outer periphery of the inner disc 13 from the inner periphery of the inner disc 13. The elongated holes 16 are spaced apart at equal angles, that is at equal angular intervals of 120°.

The fins 14 are disposed radially from the inner peripheries to the outer peripheries of both discs 12, 13 and include the first fins 14a arranged between the outer disc 12 and the inner disc 13, the second fins 14b constituting first reinforcement fins arranged between the outer disc 12 and the inner disc 13 along the elongated first holes 15, and the third fins 14c constituting second reinforcement fins arranged between the outer disc 12 and the inner disc 13 along the elongated second holes 16.

The other operation and effect of the disc rotor according to this second embodiment is the same as in the first embodiment.

By virtue of the present invention, a plurality of long holes are formed at equal first angular intervals in the outer disc and a plurality of second long holes are formed in the inner disc at equal second angular intervals different from the first angular interval so that during braking operation, a vibration mode having a number of nodes which makes it difficult to cause brake squeal is excited or produced by the first elongated holes in the outer disc and a vibration mode having a number of nodes which makes it difficult to cause brake squeal is excited or produced by the second elongated holes in the inner disc. The vibration modes caused in the outer and the inner discs interfere with each other by which the occurrence of a steady-state vibration mode is restrained. That is, the occurrence of brake squeal is advantageously restrained.

Further, by forming the elongated holes in the outer and inner discs, the respective discs can firmly be divided in the peripheral direction. Thus, the vibration mode having a number of nodes making it difficult to cause brake squeal can be reliably produced, whereby the occurrence of brake squeal can be restrained more firmly. It is thus possible to produce a disc rotor for a disc brake which renders it difficult to cause a steady-state vibration mode amounting to the occurrence of brake squeal.

According to the present invention, different modes for arranging the elongated holes are disclosed. Also, different first equal angular intervals and second equal angular intervals for the elongated holes in the inner and outer discs are described.

By virtue of the arrangement of the first and the second reinforcement fins, there is no concern about deforming the discs even in the case where the portions of the respective discs where the elongated holes are arranged are pressed by a pressing member during the braking operation.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A rotor for a disc brake comprising:
   an outer disc;
   an inner disc arranged coaxially with the outer disc;
   a plurality of first long holes extending from an inner periphery to an outer periphery of the outer disc and penetrating from an outer side surface of the outer disc to an inner side surface of the outer disc, said first long holes being formed at first equal angular intervals of the outer disc;
   a plurality of second long holes extending from an inner periphery to an outer periphery of the inner disc and penetrating from an outer side surface of the inner disc to an inner side surface of the inner disc, said first long holes being formed at second equal angular intervals of the inner disc different from the first equal angular intervals;
   first reinforcement fins arranged between the outer disc and the inner disc along sides of the first long holes; and
   second reinforcement fins arranged between the outer disc and the inner disc along sides of the second long holes.

2. The rotor for a disc brake according to claim 1, wherein the first long holes and the second long holes are arranged in radial directions of the outer disc and the inner disc.

3. The rotor for a disc brake according to claim 1, wherein a number of the first long holes and a number of the second long holes are selected such that a number of nodes of a vibration mode excited by the first long holes in the outer disc does not coincide with a number of nodes of a vibration mode excited by the second long holes in the inner disc, except when the number of first long holes and the number of second long holes both two nodes to be excited.

4. A rotor for a disc brake comprising:
   an outer disc having an inner periphery, an outer periphery, an inner side surface and an outer side surface;
   an inner disc arranged coaxially with respect to the outer disc and having an inner periphery, an outer periphery, and an inner side surface facing the inner side surface of the outer disc;
   a plurality of first elongated holes formed on the outer disc at first equal angular intervals, the first elongated holes extending in a direction between the inner periphery and the outer periphery of the outer disc, said plurality of first elongated holes extending completely through the outer disc so that each first elongated hole penetrates both the inner and outer side surfaces of the outer disc; and
   a plurality of second elongated holes formed on the inner disc at second equal angular intervals different from the first equal angular intervals, said second elongated holes extending in a direction between the inner periphery and the outer periphery of the outer disc.

5. The rotor for a disc brake according to claim 4, including a plurality of first reinforcement fins each arranged between the outer disc and the inner disc along one of the first elongated holes, and a plurality of second reinforcement fins each arranged between the outer disc and the inner disc along one of the second elongated holes.

6. The rotor for a disc brake according to claim 4, wherein the first and second elongated holes extend radially.

7. A rotor for a disc brake comprising:
   an outer disc having an inner periphery, an outer periphery, an inner side surface and an outer side surface;
   an inner disc arranged coaxially with respect to the outer disc and having an inner periphery, an outer periphery, and an inner side surface facing the inner side surface of the outer disc;
   a plurality of first elongated holes formed on the outer disc at first equal angular intervals, the first elongated holes extending in a direction between the inner periphery and the outer periphery of the outer disc; and
   a plurality of second elongated holes formed on the inner disc at second equal angular intervals different from the first equal angular intervals, said second elongated holes extending in a direction between the inner periphery and the outer periphery of the inner disc, said plurality of second elongated holes extending completely through the inner disc so that each second elongated hole penetrates both the inner and outer side surfaces of the inner disc.

8. The rotor for a disc brake according to claim 7, including a plurality of first reinforcement fins each arranged between the outer disc and the inner disc along one of the first elongated holes, and a plurality of second reinforcement fins each arranged between the outer disc and the inner disc along one of the second elongated holes.

9. The rotor for a disc brake according to claim 7, wherein the first and second elongated holes extend radially.

10. The rotor for a disc brake according to claim 7, wherein the first elongated holes extend completely through the outer disc.

* * * * *